Patented Jan. 12, 1954

2,666,053

UNITED STATES PATENT OFFICE 2,666,053

1-ISONICOTINYL-2,2-DISUBSTITUTED HYDRAZINES

Herman Herbert Fox, Passaic, N. J., assignor to Hoffmann-La Roche Inc., Nutley, N. J., a corporation of New Jersey No Drawing. Application November 3, 1951, Serial No. 254,801

7 Claims. (Cl. 260—247.2)

This invention relates to new derivatives of isonicotinylhydrazine and the acid addition salts thereof. More particularly, this invention relates to compounds of the group consisting of 1-isonicotinyl-2,2-dialkylhydrazines, 1 - isonicotinyl-2,2 - diarylhydrazines, and 1 - isonicotinyl - 2,2-R′, R″-hydrazines where R′ and R″ together with the N atom to which they are attached form a secondary N-heterocyclic group, e. g., piperidyl and morpholinyl. The compounds comprising my invention may, in the form of the free base, be represented by the following formula:

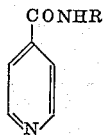

CONHR wherein R is a member of the class consisting of N(alkyl)₂, N(aryl)₂, and secondary N-heterocyclic groups, e. g., piperidyl or morpholinyl, the N of the R group being attached to the N of the CONH group. My invention also embraces the acid addition salts of the compounds.

The new compounds are useful in the field of therapeutics, and more particularly, they are useful as antituberculosis agents. In general, the new compounds can be prepared by reacting isonicotinyl chloride or its hydrochloride with dialkyl- or diarylhydrazines, or with N-amino secondary N-heterocyclic compounds, e. g., N-aminopiperidine or N-aminomorpholine. It is preferred to carry out the reaction in the presence of an acid binding agent or acid acceptor, e. g., pyridine, in order to neutralize the hydrochloric acid formed during the reaction. The free bases thus obtained readily form acid addition salts on treatment with acids, e. g., hydrochloric acid, hydrobromic acid, nitric acid, sulfuric acid, phosphoric acid, ethane sulfonic acid, tartaric acid, and the like.

The following examples will serve to illustrate the invention:

*Example 1*

To 36 grams of isonicotinyl chloride hydrochloride in 150 cc. of pyridine were added portionwise, with stirring, 18 grams of asymmetric dimethylhydrazine. The reaction mixture heated up spontaneously and a dark brown solution was formed. The pyridine was removed under vacuum, and the residue was treated with a saturated solution of potassium carbonate to mild alkalinity. The mixture was then repeatedly extracted with chloroform, and the chloroform extracts were combined and evaporated to dryness. The crystalline residue on recrystallization from benzene gave large colorless spires of 1-isonicotinyl-2,2-dimethylhydrazine, M. P. 120–121° C.

The dihydrochloride of 1-isonicotinyl-2,2-dimethylhydrazine was obtained by treating a solution of the base in isopropanol with an excess of ethanolic hydrogen chloride. The pale yellow crystals of the dihydrochloride decomposed at 210–211° C.

*Example 2*

Isonicotinyl chloride hydrochloride (35.6 grams), 150 cc. of pyridine, and 17.6 grams of asymmetric diethylhydrazine were reacted in a manner similar to that described in Example 1. The oily residue which remained after removal of chloroform was dissolved in hot benzene and decolorized with carbon. On cooling, colorless prisms of 1-isonicotinyl-2,2-diethylhydrazine were obtained, M. P. 89.5–90.5° C.

The dihydrochloride of 1-isonicotinyl-2,2-diethylhydrazine was obtained by treating a solution of the free base in isopropanol with excess ethanolic hydrogen chloride. It was obtained in the form of white needles which decomposed at 205–208° C.

*Example 3*

To 21 grams of isonicotinyl chloride hydrochloride in 100 cc. of pyridine were added portionwise, with stirring, 10 grams of N-aminopiperidine. The mixture heated up spontaneously. When the reaction was complete, the pyridine was removed under vacuum. The residue was made alkaline with a saturated solution of potassium carbonate. The resulting mixture was then repeatedly extracted with chloroform, and the chloroform extracts were combined and evaporated to dryness. The residue thus obtained was 1-isonicotinyl-2,2-pentamethylenehydrazine which may also be designated as N-(1-piperidyl)isonicotinamide. Upon recrystallization from toluene, it gave pale yellow crystal clusters, M. P. 174.5–175.5° C.

*Example 4*

To 19.2 grams of isonicotinyl chloride hydrochloride in 100 cc. of pyridine were added, with stirring, 15 grams of N-aminomorpholine hydrochloride. Some heat was evolved spontaneously, but to insure completion of the reaction, the mixture was heated on a steam bath for about 20 minutes. When the reaction was complete, the pyridine was removed under vacuum and the residue was made alkaline with a saturated solution of potassium carbonate. The mixture was then repeatedly extracted with chloroform, and the chloroform extracts were combined and evaporated to dryness. The crystalline residue was recrystallized from ethyl acetate to give long white needles of 1-isonicotinyl-2,2-($\beta,\beta'$-oxydiethylene)hydrazine which may be also designated as N - (4 - morpholinyl) isonicotinamide, M. P. 195.5–196.5° C.

Example 5

To 12 grams of isonicotinyl chloride hydrochloride in 100 cc. of pyridine were added, with stirring, 14.5 grams asymmetric diphenylhydrazine. Some heat was evolved spontaneously, but to insure completion of the reaction, the mixture was heated for about 15 minutes on a steam bath. The pyridine was then removed under vacuum, and the residue was treated with a saturated solution of potassium carbonate to mild alkalinity. A brown crystalline substance was formed which was filtered off and recrystallized from benzene. There was thus obtained 1-isonicotinyl-2,2-diphenylhydrazine in the form of pale yellow needles, M. P. 183.5–184.5° C.

I claim:

1. A compound selected from the group consisting of 1-isonicotinyl-2,2-di-lower alkyl hydrazine, 1-isonicotinyl - 2,2 - diphenylhydrazine, 1-isonicotinyl-2,2-pentamethylenehydrazine, and 1-isonicotinyl - 2,2 - ($\beta,\beta'$-oxydiethylene) hydrazine, and the acid addition salts thereof.
2. 1-isonicotinyl-2,2-di-lower alkyl hydrazine.
3. 1-isonicotinyl-2,2-dimethylhydrazine.
4. 1-isonicotinyl-2,2-diethylhydrazine.
5. 1-isonicotinyl-2,2-diphenylhydrazine.
6. 1 - isonicotinyl - 2,2 - pentamethylenehydrazine.
7. 1 - isonicotinyl - 2,2 - ($\beta,\beta'$-oxydiethylene) - hydrazine.

HERMAN HERBERT FOX.

References Cited in the file of this patent
Fieser et al.: "Org. Chem.," (1944) p. 32.